Patented Feb. 3, 1953

2,627,508

UNITED STATES PATENT OFFICE 2,627,508

LONG OIL ALKYD RESINS

Funston G. Lum, Richmond, Calif., assignor to California Research Corporation, San Francisco, Calif., a corporation of Delaware No Drawing. Application June 27, 1949, Serial No. 101,680

18 Claims. (Cl. 260—22)

My invention relates to oil-modified alkyd resins having a high content of semi-drying oil and a high viscosity in solution in a hydrocarbon solvent sufficient to cause fast drying of such alkyd resins when employed in protective surface-coatings. Furthermore, this invention relates to the process of preparing such semi-drying oil-modified alkyd resins.

The term "alkyd resins" as employed in this specification shall designate generically polymeric polyesters of polyhydric alcohols having more than two hydroxyl groups and resinifying polycarboxylic organic acids or their anhydrides. It has been a common practice to modify the composition of such alkyd resins by the introduction of organic monocarboxylic fatty acids derived from vegetable oils or animal fats to replace a portion of the polycarboxylic acid in the resin. This may be effected by the direct one-stage cooking of monocarboxylic fatty acids with a polyhydric alcohol and a polycarboxylic acid in one single stage.

Another way is to proceed in two stages. The first stage consists of heating the oil containing monocarboxylic fatty acids in the form of triglycerides with a polyhydric alcohol, in order to produce a mixture of partial esters of polyhydric alcohols and monocarboxylic fatty acids by the so-called "alcoholysis" of the oil (described in U. S. Patent 2,044,747 to Ott, Bernard and Frick). In the second stage this mixture of partial esters is condensed with a polycarboxylic acid to a substantially completely esterified alkyd resin of a low acid number. These oil-modified alkyd resins are generally defined in the art in terms of their relative oil content or "oil length" calculated as triglyceride in per cent by weight of the final resin. The word "oil" as used here denotes oil obtained by esterification of a polyhydric alcohol with monocarboxylic fatty acids. Thus glycerol esterified with fatty acids to triglyceride may be called "glycerol oil," and pentaerythritol esterified with fatty acids to a tetra-ester (tetra-pentaerythritide) may be called "pentaerythritol oil." The longer the oil length of an alkyd resin, the greater its compatibility with hydrocarbon solvents and the higher the resistance to weathering and moisture of surface coatings applied from its solutions in such solvents.

In the past, the major proportion of industrially produced alkyd resins has been derived from glycerol and orthophthalic acid which was usually employed in the form of its anhydride. By modifying these glyceryl orthophthalate alkyd resins with drying oil, products are obtained which dissolve in hydrocarbon solvents and, when so dissolved, are suitable for formulation of a variety of surface-coating compositions.

It is well known that the exports of the most widely used drying oils such as linseed oil of Argentina and Russia and tung oil of China are subject to considerable fluctuation both with respect to the amount available and prices asked, resulting in frequent shortages of these oils so vital to our domestic industries. On the other hand, the domestic production of semi-drying oils, as typified by soybean oil, is steadily increasing from year to year with the consequent lowering of prices asked for semi-drying oils. As a consequence, semi-drying oils, and particularly the soybean oil, are widely used in the United States to modify alkyd resins.

At the same time the industry has become aware of the fact that among the various polyhydric alcohols proposed for the production of alkyd resins, other than the conventional glycerol, pentaerythritol is the most desirable material for producing semi-drying oil modified alkyd resins with phthalic anhydride. Owing to the tetrafunctionality of pentaerythritol, the alkyd resins produced therefrom and modified by semi-drying oils, when dissolved in hydrocarbon solvents, are more impervious to moisture and chemicals and dry more rapidly than those alkyd resins formulated from glycerol, phthalic anhydride and semi-drying oil. For example, alkyd resins have been prepared in accordance with the general procedure described hereinbefore from pentaerythritol, phthalic anhydride and soybean oil and applied in solution of suitable aliphatic and aromatic hydrocarbon solvents, e. g., 350 mineral spirits, toluol, xylol, in various types of surface coating (see U. S. Patent No. 2,315,708 to Hovey et al.). The term 350 mineral spirits as used in this specification designates a petroleum distillate boiling within the range from 320° F. to about 395° F., 50% boiling over at 342–343° F. (ASTM—Distillation D-86).

However, until now the manufacture of semi-drying oil modified alkyd resin from pentaerythritol and phthalic anhydride (or orthophthalic acids) has been limited to alkyd resins with oil lengths not exceeding 70% by weight of the resin, because all attempts to modify such resins to higher oil lengths yielded products whose solutions in hydrocarbon solvents displayed low viscosity and relatively low drying rate, thus being unsuitable for protective surface-coatings.

Additional reactive components, e. g. maleic anhydride or furyl acrylic acid must therefore be employed to achieve satisfactory fast-drying rates of surface-coating compositions formulated with a semi-drying oil-modified alkyd resin from pentaerythritol and phthalic anhydride, characterized by oil lengths from 70 to 80%.

I have now found that the addition of auxiliary reactive compounds such as maleic anhydride is obviated, and new and improved oil-modified alkyd resins with oil lengths from about 70 to about 80% are obtained by employing semi-drying oils, pentaerythritol and phthalic acids in which the carboxylic groups are separated from each other by at least 3 carbon atoms of the benzene ring. These improved alkyd resins dissolve in hydrocarbon solvents and form solutions of high viscosity, which dry at much faster rates than the comparable solutions of alkyd resins with oil lengths from about 70 to about 80% prepared from phthalic anhydride (or orthophthalic acid), pentaerythritol and a semi-drying oil.

The term "phthalic acid in which the carboxyl groups are separated from each other by at least 3 carbon atoms of the benzene ring" includes not only isophthalic and terephthalic acids, and mixtures of these two acids, but also substituted isophthalic and terephthalic acids containing substituents inert under the conditions of reaction between the hydroxyl groups of partial esters of pentaerythritol and the carboxyl groups of isophthalic or terephthalic acids, e. g., 4-methyl terephthalic acid.

Among the semi-drying oils which may be employed in preparing the alkyd resins with oil lengths from about 70 to about 80% in accordance with my invention, are included soybean oil, sunflower oil, safflower oil, walnut oil, and, in general, all those natural oils of vegetable or animal origin having iodine numbers ranging from about 130 to about 150.

To prepare my new alkyd resins modified by semi-drying oils and containing oil lengths from about 70 to about 80% calculated as triglyceride by a two-stage process mentioned hereinbefore, pentaerythritol is reacted with a semi-drying oil in amounts equal to approximately 1 mol of pentaerythritol to each mol of a semi-drying oil under the conditions of alcoholysis in the presence of a basic catalyst such as litharge or sodium hydroxide in amounts ranging from 0.01 to 0.10% by weight based on reaction ingredients. The reaction is effected by heating the mixture of pentaerythritol and semi-drying oil at from about 230 to about 260° C. for a period of time which may require from about 30 minutes to 5 hours. The resulting mixture of partial esters of pentaerythritol and glycerol is soluble in alcohol and contains on the average from 1.5 to 2.4 hydroxyl groups per molecule. This mixture of partial esters is condensed (cooked) with about 2 mols of phthalic acid, such as isophthalic or terephthalic, at a temperature from about 230° to about 280° C., until the desired acid number of less than 15 and the desired viscosity of at least 4 poises at 25° C. in a solution of 350 mineral spirits are obtained. The whole operation may be effected in conventional cooking vessels or kettles of any suitable size, equipped with adequate heating and stirring means, openings for charging the ingredients, sampling the product and, if it is desired to exclude oxidative effects of the air, provided with inlets and outlets for the passage of an inert gas. A slight excess of about 5 to about 20% of pentaerythritol should be used in the process in order to secure a low acid number.

If desired, a portion of pentaerythritol may be withheld from the reaction of formation of partial esters of pentaerythritol, as the presence of an excess may result in the occurrence of inter-reaction of pentaerythritol molecules, and also because an excess of pentaerythritol may drop as a sludge to the bottom of the cooking vessel, interfering with the operation of the stirring means.

When straight monocarboxylic fatty acids recovered from semi-drying oils are used to modify the alkyd resin instead of an oil, the preliminary formation of partial esters by alcoholysis may be omitted, and the fatty acids, pentaerythritol and the particular phthalic acid in a ratio of about 2 mols of fatty acids per 1 mol of pentaerythritol and 1 mol of phthalic acid may be added together to secure the oil content from about 70 to about 80% calculated as tetrapentaerythritide. This mixture of reactants is heated at the desired temperature from about 230° C. to about 280° C. to a desired low acid number of less than 15 and a desired viscosity of at least 4 poises at 25° C. in a solution of 350 mineral spirits. When operating in this manner, the use of a basic catalyst is superfluous.

However, even in the case of using straight monocarboxylic fatty acids, it is preferred first to preheat the fatty acids to about 200° C. and then to add thereto the required amount of pentaerythritol, followed by the phthalic acid, thereby avoiding a possible charring of solid pentaerythritol, which may occur in heating from room temperature.

The monocarboxylic fatty acids which may be employed for the direct one-stage preparation of my alkyd resins are monocarboxylic unsaturated aliphatic acids having from 16 to 18 carbon atoms in the molecule and containing from about 1.4 to about 1.75 carbon double bonds per molecule, such as are present in semi-drying oils, for instance, the linoleic acid or mixtures thereof with other semi-drying oil fatty acids.

The desired acid number and the viscosity in solutions of hydrocarbon solvents may be also achieved by heating to a higher temperature than 230° C., or for a longer time than 5 hours, or by both means. An extended heating period, however, may ultimately result in the premature gelation of the resin cook, particularly in preparing resin with semi-drying oil lengths from about 70% to about 74%. To delay such premature gelation, it is sometimes advisable to incorporate a low molecular weight, fast-dissolving monocarboxylic organic acid, such as toluic or benzoic, into the mixture of phthalic acid and partial esters of pentaerythritol.

In the examples given hereinafter, the viscosity of alkyd resins of my invention in 60% solutions thereof in 350 mineral spirits and the drying characteristics of these solutions are compared with the viscosity and drying characteristics of similar solutions of conventional semi-drying oil-modified alkyd resin prepared from pentaerythritol and phthalic anhydride and likewise having oil lengths from about 70% to about 80%. The data of these examples show unambiguously that alkyd resins, containing from about 70% to about 80% of a semi-drying oil and prepared in accordance with my invention, have higher viscosity in a 60% solution in 350 mineral spirits and superior drying characteristics than those of the orthophthalate alkyd resins prepared from pentaerythritol and phthalic anhydride.

In all examples, the solutions of alkyd resins contain a mixed drier consisting of 0.03% of cobalt naphthenate and 0.3% by weight of lead naphthenate, on non-volatile basis.

*Example 1.*—The alkyd resin of this example is prepared by heating 0.28 mol of soybean oil with 0.37 mol of technical grade pentaerythritol at 245° C. for 30 minutes in the presence of 0.2 g. of litharge as a catalyst. The resulting alcohol-soluble partial ester mixture is then combined with 0.68 mol of phthalic anhydride, and this batch is cooked for 12 hours at 230° C. to an acid number of 14. The oil content (oil length) of this soybean oil-modified alkyd is equal to 65%. A 60% solution of this alkyd in 350 mineral spirits has a viscosity of 2.0 poises at 25° C.

*Example 2.*—A similar alkyd resin having an oil length of 65% is prepared by heating soybean oil and technical grade pentaerythritol in the amounts and under conditions shown in Example 1. The resulting partial ester mixture is then heated with 0.68 mol of isophthalic acid at 245° C. for 2 hours to an acid number of 30. When heated for 15 minutes more, the resin gels before an acid number lower than 15 is reached. A 60% solution of this resin in 350 mineral spirits is characterized by a viscosity of 36.2 poises at 25° C.

*Example 3.*—An alkyd resin with an oil length of 70% is prepared by heating together 0.93 mol of soybean oil fatty acids, 0.56 mol of pentaerythritol and 0.59 mol of phthalic anhydride for 6 hours at 250° C. The resulting alkyd resin has an acid number equal to 8, and its 60% solution in 350 mineral spirits possesses viscosity of 2.00 poises at 25° C. When brushed out as a surface coating, the solution dries dust-free in about 4 to 5 hours and tack-free in about 6 hours.

*Example 4.*—An alkyd resin with an oil length of 70% is prepared by heating 1.19 mols of soybean oil and 1.28 mols of pentaerythritol in the presence of 0.75 g. of litharge catalyst at 245° C. for a period of ½ hour. The resulting mixture of partial esters is combined with 2.24 mols of a mixture of isophthalic and terephthalic acids in a ratio of 3 parts of isophthalic to 1 part of terephthalic. This batch is heated at 260° C. for 3¾ hours until a resin having an acid number of 13 is produced. Its 60% solution in 350 mineral spirits has a viscosity of 148 poises at 25° C. Surface coatings brushed out from this solution dry dust-free in about 1¼ hours and tack-free in about 2 hours.

*Example 5.*—Another alkyd resin with an oil length of 80% is prepared by heating together 1.06 mols of soybean oil fatty acids, 0.49 mol of pentaerythritol and 0.40 mol of phthalic anhydride for 6½ hours at about 250° to 255° C. The acid number of the resulting resin lies between 7 and 8. The viscosity of its 60% solution in 350 mineral spirits is equal to about 0.2 poises at 25° C. Applied in a surface coating, the solution dries dust-free in about 4 to 5 hours and tack-free in about 7 to 8 hours.

*Example 6.*—A similar alkyd resin with an oil length of 80% is prepared by heating a batch of 1.06 mols of soybean oil fatty acids, 0.49 mol of pentaerythritol and 0.40 mol of isophthalic acid for 13 hours at 260° C. to an acid number of 2. A 60% solution of the final product in 350 mineral spirits has a viscosity of 10.70 poises at 25° C. If heated for 2 hours more, the resin gels. Surface coatings brushed out from the aforementioned solution in mineral spirits dry dust-free in about 1¼ hours and tack-free in about 1½ to 2 hours.

*Example 7.*—In this example an alkyd resin similar to that of Example 5 and containing up to about 80% oil is prepared by heating together 1.06 mols of soybean oil fatty acids, 0.49 mol of pentaerythritol and 0.40 mol of terephthalic acid for 6 hours at 275° C. The acid number of the ultimate product is 5. The viscosity of a 60% solution thereof in 350 mineral spirits is equal to 6.27 poises at 25° C. When brushed out in a surface coating, the solution dries dust-free in about 1¼ hours and tack-free in about 1¾ to 2 hours. Upon continued heating of the resin at 275° C. for about 2 to 3 hours, gelation is obtained.

Thus, it is seen from the above data that the semi-drying oil-modified alkyd resins, prepared in accordance with my invention from pentaerythritol and isophthalic and/or terephthalic acids and having oil lengths from about 70 to about 80%, are capable of forming solutions in hydrocarbon solvents favorably comparing as regards viscosity and drying rates with alkyd resins prepared from soybean oil, pentaerythritol and phthalic anhydride, and, consequently, are preferable for the purposes of surface-coating industry.

Dissolved in appropriate solvents, and applied therefrom by brushing or spraying to various surfaces, these resins dry rapidly, forming durable, glossy films which favorably compare with those previously obtained in the art with other types of surface coatings. Suitable pigments, as well as conventional anti-skinning agents and metal soap driers, may be added to the formulations containing the alkyd resins of my invention. In addition, my alkyd resins are readily miscible with a variety of compatible fillers, dyes, plasticizers and thinners, and a number of other similarly compatible film-forming materials such as drying oils, varnishes, and various natural and synthetic resins, by employing any of the available methods of the art. They possess an excellent brushability, and films prepared therewith are resistant to weathering and moisture.

As many apparently widely different embodiments of my invention may be made without departing from the spirit and scope thereof, it is to be understood that this invention is not intended to be limited to the specific examples hereinabove except as defined in the following claims.

I claim:

1. An alkyd resin consisting of a product of condensation of a phthalic acid in which the carboxyl groups are separated from each other by at least 3 carbon atoms of the benzene ring and which is free from reactive substituents other than said carboxyl groups, with the product of alcoholysis of a semi-drying oil by pentaerythritol, said product of alcoholysis essentially consisting of a mixture of partial esters of polyhydric alcohols from the group consisting of pentaerythritol and glycerol, and containing on the average from 1.5 to 2.4 hydroxyl groups per molecule, said alkyd resin having a semi-drying oil length of 70 to 80%, calculated as triglyceride, an acid number of less than 15 and being further characterized by its ability to dissolve in 350 mineral spirits to produce a 60% solution having a viscosity of at least 4 poises at 25° C. and a tack-free drying time of about 2 hours.

2. An alkyd resin, as defined in claim 1, wherein said phthalic acid is isophthalic acid.

3. An alkyd resin, as defined in claim 1, wherein said phthalic acid is terephthalic acid.

4. An alkyd resin, as defined in claim 1, wherein said phthalic acid is isophthalic acid and said semi-drying oil is soybean oil.

5. An alkyd resin, as defined in claim 1, wherein said phthalic acid is terephthalic acid and said semi-drying oil is soybean oil.

6. An alkyd resin consisting of a product of condensation of a phthalic acid in which the carboxyl groups are separated from each other by at least 3 carbon atoms of the benzene ring, and which is free from reactive substituents other than said carboxyl groups, with pentaerythritol and semi-drying oil fatty acids containing from about 1.4 to about 1.75 carbon double bonds per molecule, said alkyd resin having a pentaerythritol oil length of 70 to 80%, calculated as tetrapentaerythritide, an acid number of less than 15 and being further characterized by its ability to dissolve in 350 mineral spirits to produce a 60% solution having a viscosity of at least 4 poises at 25° C. and a tack-free drying time of about 2 hours.

7. An alkyd resin, as defined in claim 6, wherein said semi-drying oil fatty acids are soybean oil fatty acids and said phthalic acid is isophthalic acid.

8. An alkyd resin, as defined in claim 6, wherein said semi-drying oil fatty acids are soybean oil fatty acids and said phthalic acid is terephthalic acid.

9. A process for preparing a semi-drying modified alkyd resin having an oil length from 70 to 80%, which comprises heating pentaerythritol and a semi-drying oil under the conditions of alcoholysis in the presence of a basic catalyst at a temperature of about 230 to about 260° C. sufficient to cause formation of a mixture of partial esters of pentaerythritol and glycerol, containing on the average from 1.5 to 2.4 hydroxyl groups per molecule, and condensing said mixture of partial esters with a phthalic acid wherein the carboxyl groups are separated by at least 3 carbon atoms on the benzene ring and which is free from reactive substituents other than said carboxyl groups, at a temperature from about 230 to about 280° C., until a final alkyd resin is obtained, which has an acid number of less than 15 and a viscosity in a 60% solution thereof in 350 mineral spirits equal to at least 4 poises at 25° C.

10. A process, as defined in claim 9, wherein said semi-drying oil is soybean oil.

11. A process, as defined in claim 9, wherein said semi-drying oil is soybean oil and said phthalic acid is isophthalic acid.

12. A process, as defined in claim 9, wherein said semi-drying oil is soybean oil and said phthalic acid is terephthalic acid.

13. A process for preparing an alkyd resin by condensing at a temperature from about 230° C. to about 280° C. a mixture of a phthalic acid in which the carboxyl groups are separated from each other by at least 3 carbon atoms of the benzene ring, and which is free from reactive substituents other than said carboxyl groups, pentaerythritol and semi-drying oil fatty acids containing from about 1.4 to about 1.75 carbon double bonds per molecule to form a final alkyd resin having a pentaerythritol oil length of 70 to 80%, calculated as tetrapentaerythritide, and characterized by an acid number of less than 15 and the ability to dissolve in 350 mineral spirits, forming a 60% solution which has a viscosity of at least 4 poises at 25° C. and a tack-free drying time of about 2 hours.

14. A process, as defined in claim 13, wherein said semi-drying oil fatty acids are soybean oil fatty acids.

15. A process, as defined in claim 13, wherein said semi-drying oil fatty acids are soybean oil fatty acids and said phthalic acid is isophthalic acid.

16. A process, as defined in claim 13, wherein said semi-drying oil fatty acids are soybean oil fatty acids and said phthalic acid is terephthalic acid.

17. A process for preparing an alkyd resin by condensing at a temperature from about 230° C. to about 280° C. a mixture of phthalic acids in which the carboxyl groups are separated from each other by at least 3 carbon atoms of the benzene ring and which is free from reactive substituents other than said carboxyl groups, pentaerythritol and semi-drying oil fatty acids containing from about 1.4 to about 1.75 carbon double bonds per molecule to form a final alkyd resin having a pentaerythritol oil length of 70 to 80%, calculated as tetrapentaerythritide, and characterized by an acid number of less than 15 and the ability to dissolve in 350 mineral spirits, forming a 60% solution which has a viscosity of at least 4 poises at 25° C. and a tack-free drying time of about 2 hours.

18. An alkyd resin consisting of a product of condensation of a phthalic acid, in which the carboxyl groups are separated from each other by at least 3 carbon atoms of the benzene ring and which is free from reactive substituents other than the carboxyl groups, with the product of reaction between pentaerythritol and a material selected from the group consisting of semi-drying oil fatty acids and semi-drying oils, said product of reaction consisting essentially of a mixture of partial esters of polyhydric alcohols from the group consisting of pentaerythritol and glycerol, and containing on the average from 1.5 to 2.4 hydroxyl groups per molecule, said alkyd resin having a semi-drying oil length of 70 to 80%, calculated as triglyceride, an acid number of less than 15 and being further characterized by its ability to dissolve in 350 mineral spirits to produce a 60% solution having a viscosity of at least 4 poises at 25° C. and a tack-free drying time of about 2 hours.

FUNSTON G. LUM.

REFERENCES CITED

The following references are of record in the file of this patent:

UNITED STATES PATENTS

| Number | Name | Date |
|---|---|---|
| 2,315,708 | Hovey et al. | Apr. 6, 1943 |

FOREIGN PATENTS

| Number | Country | Date |
|---|---|---|
| 414,665 | Great Britain | Aug. 7, 1934 |
| 585,496 | Great Britain | Feb. 7, 1947 |

OTHER REFERENCES

Hovey et al.: Paint Oil & Chem. Review, Jan. 18, 1940, pp. 9–12, 37, 38, and 42.

Chatfield: Varnish Constituents (Interscience Pub.), 1944 p. 403.